(No Model.)
T. A. MYERS.
PISTON ROD PACKING.
No. 296,295. Patented Apr. 1, 1884.
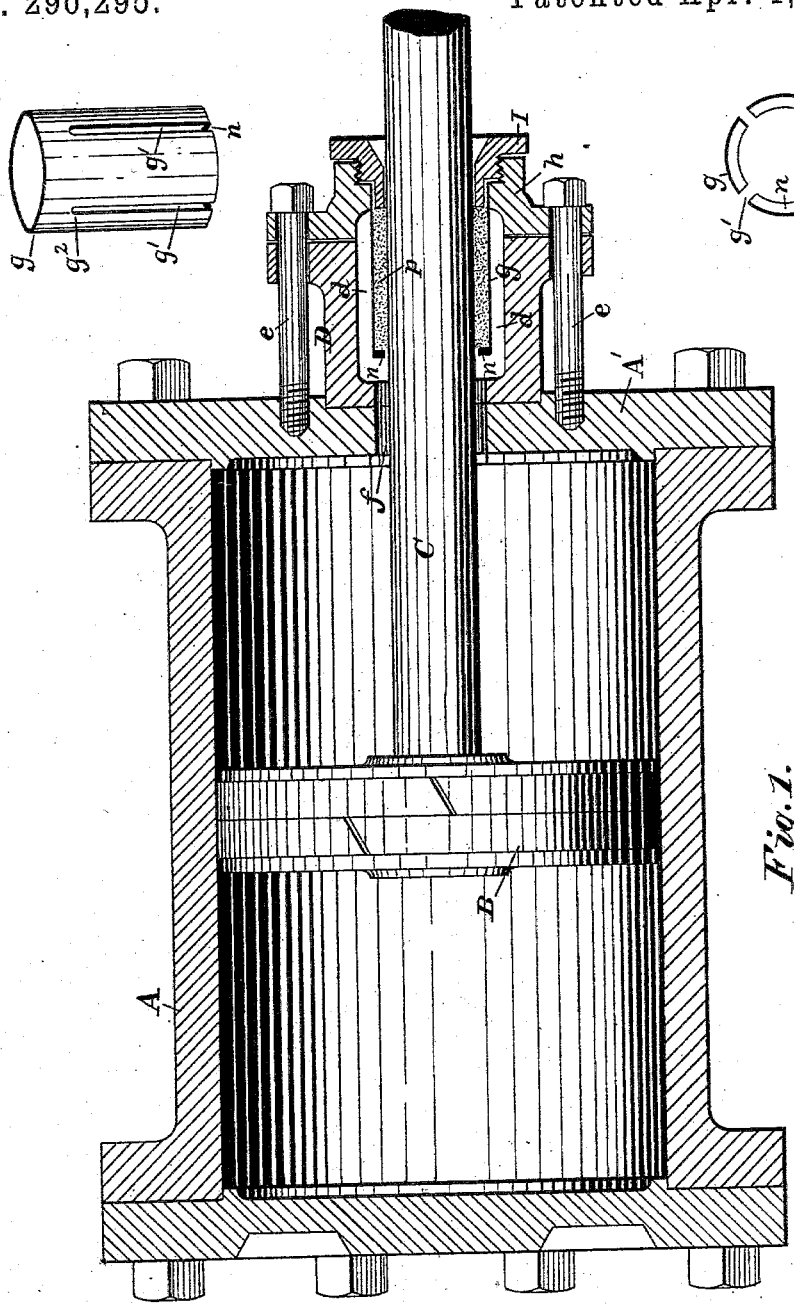
Witnesses:
A. C. Eader
Jno. E. Morris.
Inventor:
Theo. A. Myers
By Chas. B. Mann
Attorney.

United States Patent Office.

THEODORE A. MYERS, OF WHEELING, WEST VIRGINIA.

PISTON-ROD PACKING.

SPECIFICATION forming part of Letters Patent No. 296,295, dated April 1, 1884.

Application filed November 30, 1883. (No model.)

*To all whom it may concern:*

Be it known that I, THEODORE A. MYERS, a citizen of the United States, residing at Wheeling, in the county of Ohio and State of West Virginia, have invented certain new and useful Improvements in Piston-Rod Packing, of which the following is a specification.

My invention relates to an improvement in stuffing-boxes for piston-rod packing and stems of steam-valves.

The invention is fully illustrated in the accompanying drawings, and will first be described in connection therewith, and then designated in the claims.

Figure 1 shows a steam-cylinder, piston, piston-rod, and my improved packing. Fig. 2 is a side view, separately, of the slit packing-tube. Fig. 3 is a cross-section of the slit packing-tube, showing the inner projections at the end.

The letter A designates the cylinder; B, the piston-head, and C the piston-rod. A metal chamber, D, is seated against the head A' of the cylinder, to which it is made fast by bolts $e$. The hole $f$ in the head, separating the stuffing-box from the cylinder, through which the piston-rod passes freely, is enough larger than the rod to allow the steam to enter the annular space $d$ in the chamber D. This chamber surrounds the packing-tube $g$.

The packing-tube has longitudinal slits $g'$, extending from one end to $g^2$, near the other end. There may be four or more of these slits, which divide the tube into as many divisions. This packing-tube surrounds the stem or rod, and, as the tube is thin, the divisions are adapted to expand and contract, as hereinafter stated.

The stuffing-box consists of the metal chamber D, having a cap, $h$, threaded to receive the nut I, through which passes the rod or stem C. The nut is simply to close the end of the packing-tube, one end of which is secured to the cap $h$ of the stuffing-box. The expansible ends of the several divisions of the slit packing-tube are provided with inward projections $n$, to press against and around the rod or stem C.

The annular space between the rod and packing-tube constitutes the packing-chamber $p$, which is to be filled with any suitable packing material, which latter rests directly against the piston-rod. The steam entering the annular chamber $d$ presses against the outer side of the expansible packing-tube, causing it to contract against the packing material and make the latter tight about the rod. The inward projections $n$ at the same time also close around the rod. When the steam exhausts at the forward end of the cylinder, the pressure on the outer side of the packing-tube is off, thereby allowing the slit divisions to expand and relieve the piston-rod of the excessive friction of the packing while making the outward stroke.

By this device all necessity of screwing up nuts to tighten the packing is avoided. Another advantage resulting from this device is that in case the moisture in the packing should freeze, no damage will ensue to the stuffing-box, because the packing-tube will expand.

This packing is designed for piston-rods and valve-stems, or any use where a moving rod is to be made steam-tight at an orifice through which it passes.

Having described my invention, I claim and desire to secure by Letters Patent of the United States—

1. The herein-described improvement in packing for piston-rods and stems of valves, consisting of a chamber having an annular space, $d$, and a hole through which passes the rod, and which allows the steam to enter the annular space, and a packing-tube, $g$, within the chamber, having divisions made by longitudinal slits $g'$, and one end of the tube being secured to the cap of the chamber, whereby steam entering the annular space around the packing-tube causes it to contract and the exhaust of the steam allows it to expand, as set forth.

2. A packing-tube for piston-rods and stems of valves, having divisions made by longitudinal slits $g'$ and inward projections $n$ on the expansible ends of the several divisions, as set forth.

In testimony whereof I affix my signature in presence of two witnesses.

THEODORE A. MYERS.

Witnesses:
J. R. COWDEN,
W. J. W. COWDEN.